United States Patent
Wang et al.

(10) Patent No.: US 9,824,238 B1
(45) Date of Patent: Nov. 21, 2017

(54) ENCODING OF SENSITIVE DATA

(71) Applicant: Shape Security Inc., Palo Alto, CA (US)

(72) Inventors: Xinran Wang, San Ramon, CA (US); Yao Zhao, Fremont, CA (US)

(73) Assignee: Shape Security, Inc., Mountain View, CA (US)

( * ) Notice: Subject to any disclaimer, the term of this patent is extended or adjusted under 35 U.S.C. 154(b) by 0 days.

(21) Appl. No.: 14/286,324

(22) Filed: May 23, 2014

(51) Int. Cl.
*G06F 21/10* (2013.01)
*G06F 21/64* (2013.01)

(52) U.S. Cl.
CPC .................................. *G06F 21/64* (2013.01)

(58) Field of Classification Search
CPC ................... G06F 21/64; G06F 21/70
See application file for complete search history.

(56) References Cited

U.S. PATENT DOCUMENTS

| | | | | |
|---|---|---|---|---|
| 5,003,596 A | * | 3/1991 | Wood .............. | H04L 9/002 380/264 |
| 5,315,657 A | * | 5/1994 | Abadi ............... | G06F 9/468 340/5.74 |
| 5,892,899 A | * | 4/1999 | Aucsmith ......... | G06F 21/57 380/282 |
| 6,006,328 A | * | 12/1999 | Drake ............... | G06F 21/14 713/188 |
| 6,088,452 A | * | 7/2000 | Johnson ............ | G06F 21/14 380/28 |
| 6,594,761 B1 | * | 7/2003 | Chow ............... | G06F 21/14 713/189 |
| 6,668,325 B1 | * | 12/2003 | Collberg .......... | G06F 21/14 713/194 |
| 6,779,114 B1 | * | 8/2004 | Gu ................... | G06F 21/14 713/189 |
| 6,842,862 B2 | * | 1/2005 | Chow ............... | G06F 21/14 713/165 |
| 6,865,735 B1 | | 3/2005 | Sirer et al. | |
| 6,938,170 B1 | | 8/2005 | Kraft et al. | |
| 7,103,180 B1 | * | 9/2006 | McGregor, Jr. ... | H04L 9/0625 380/28 |
| 7,117,429 B2 | | 10/2006 | Vedullapalli et al. | |

(Continued)

FOREIGN PATENT DOCUMENTS

| | | |
|---|---|---|
| GB | 2443093 A | 4/2008 |
| WO | 9964967 | 12/1999 |

(Continued)

OTHER PUBLICATIONS

Anderson et al., "Measuring the Cost of Cybercrime," 2012 Workshop on the Economics of Information Security (WEIS), [retrieved on Oct. 15, 2013]. Retrieved from the Internet: <URL: http://web.archive.org/web/20130623080604/http://weis2012.econinfosec.org/papers/Anderson_WEIS2012.pdf>, 31 pages, Jun. 2012.

(Continued)

*Primary Examiner* — Sharon Lynch

(57) ABSTRACT

A computer-implemented method, the method includes identifying a piece of data to be served from a server system to a client device that is remote from the server system; creating a plurality of expressions that, when executed, provide a result that corresponds to the piece of data; and providing the plurality of expressions to the client device with code for executing the plurality of expressions.

20 Claims, 9 Drawing Sheets

(56) References Cited

U.S. PATENT DOCUMENTS

| | | | |
|---|---|---|---|
| 7,430,670 B1* | 9/2008 | Horning | G06F 21/14 713/190 |
| 7,475,341 B2 | 1/2009 | Malik | |
| 7,480,385 B2 | 1/2009 | Weber | |
| 7,500,099 B1 | 3/2009 | McElwee et al. | |
| 7,506,177 B2* | 3/2009 | Chow | G06F 21/14 713/189 |
| 7,580,521 B1* | 8/2009 | Spies | H04L 9/3073 380/281 |
| 7,587,616 B2* | 9/2009 | Jakubowski | G06F 21/14 713/189 |
| 7,620,987 B2* | 11/2009 | Shelest | G06F 21/566 713/189 |
| 7,624,449 B1 | 11/2009 | Perriot | |
| 7,707,223 B2 | 4/2010 | Zubenko et al. | |
| 7,836,425 B2 | 11/2010 | Rubin et al. | |
| 7,961,879 B1* | 6/2011 | Spies | H04L 9/3073 380/281 |
| 8,020,193 B2 | 9/2011 | Bhola et al. | |
| 8,077,861 B2* | 12/2011 | Damgaard | H04L 9/0631 380/277 |
| 8,170,020 B2 | 5/2012 | Oliver et al. | |
| 8,185,749 B2* | 5/2012 | Ciet | G06F 7/00 713/154 |
| 8,200,958 B2 | 6/2012 | Coppola et al. | |
| 8,225,401 B2 | 7/2012 | Sobel et al. | |
| 8,266,202 B1 | 9/2012 | Colton et al. | |
| 8,332,952 B2 | 12/2012 | Zhang et al. | |
| 8,347,398 B1* | 1/2013 | Weber | G06F 21/85 713/189 |
| 8,353,037 B2 | 1/2013 | Franklin et al. | |
| 8,392,910 B1* | 3/2013 | Asher | G06F 8/61 717/174 |
| 8,393,003 B2* | 3/2013 | Eker | G06F 21/14 713/194 |
| 8,424,090 B2 | 4/2013 | Kang | |
| 8,510,571 B1 | 8/2013 | Chang | |
| 8,527,774 B2 | 9/2013 | Fallows et al. | |
| 8,533,480 B2 | 9/2013 | Pravetz et al. | |
| 8,578,166 B2 | 11/2013 | De Monseignat et al. | |
| 8,590,041 B2 | 11/2013 | Brinkley et al. | |
| 8,661,549 B2* | 2/2014 | Chevallier-Mames | G06F 21/10 726/22 |
| 8,762,705 B2* | 6/2014 | He | H04L 63/0428 713/150 |
| 8,806,627 B1 | 8/2014 | Aharoni | |
| 8,904,279 B1 | 12/2014 | Bougon | |
| 9,178,908 B2* | 11/2015 | Call | H04L 63/1425 |
| 9,241,004 B1* | 1/2016 | April | G06F 21/606 |
| 9,294,502 B1 | 3/2016 | Benishti | |
| 2002/0016918 A1 | 2/2002 | Tucker et al. | |
| 2003/0005129 A1 | 1/2003 | Scheinkman | |
| 2003/0159063 A1* | 8/2003 | Apfelbaum | G06F 21/577 726/25 |
| 2003/0163718 A1* | 8/2003 | Johnson | G06F 12/1408 713/193 |
| 2004/0101142 A1* | 5/2004 | Nasypny | G06F 21/602 380/278 |
| 2004/0139340 A1* | 7/2004 | Johnson | G06F 21/14 713/194 |
| 2004/0162994 A1 | 8/2004 | Cohen | |
| 2004/0245525 A1 | 12/2004 | Yamazaki et al. | |
| 2005/0002532 A1* | 1/2005 | Zhou | H04L 9/302 380/277 |
| 2005/0166191 A1* | 7/2005 | Kandanchatha | G06F 21/50 717/137 |
| 2005/0183072 A1* | 8/2005 | Horning | G06F 21/14 717/140 |
| 2005/0204348 A1* | 9/2005 | Horning | G06F 21/14 717/140 |
| 2005/0210275 A1* | 9/2005 | Homing | G06F 21/14 713/190 |
| 2005/0278626 A1 | 12/2005 | Malik | |
| 2006/0031686 A1* | 2/2006 | Atallah | G06F 12/1408 713/190 |
| 2006/0034455 A1* | 2/2006 | Damgaard | H04L 9/0861 380/28 |
| 2006/0101047 A1* | 5/2006 | Rice | G06F 21/52 |
| 2006/0195588 A1* | 8/2006 | Pennington | G06F 21/53 709/227 |
| 2006/0195703 A1 | 8/2006 | Jakubowski | |
| 2006/0253687 A1 | 11/2006 | Jakubowski | |
| 2007/0011295 A1 | 1/2007 | Hansen | |
| 2007/0039048 A1* | 2/2007 | Shelest | G06F 21/566 726/22 |
| 2007/0074227 A1 | 3/2007 | Naidu et al. | |
| 2007/0234070 A1* | 10/2007 | Horning | G06F 21/14 713/190 |
| 2008/0025496 A1* | 1/2008 | Smith | G06F 21/64 380/28 |
| 2008/0208560 A1* | 8/2008 | Johnson | G06F 21/14 703/22 |
| 2008/0216051 A1* | 9/2008 | Johnson | G06F 21/14 717/110 |
| 2008/0222736 A1 | 9/2008 | Boodaei et al. | |
| 2008/0229394 A1* | 9/2008 | Stering | G06F 21/6245 726/4 |
| 2009/0077383 A1* | 3/2009 | de Monseignat | H04L 63/0823 713/175 |
| 2009/0099988 A1 | 4/2009 | Stokes et al. | |
| 2009/0119515 A1* | 5/2009 | Nicolson | G06F 21/14 713/190 |
| 2009/0144829 A1 | 6/2009 | Grigsby et al. | |
| 2009/0193513 A1* | 7/2009 | Agarwal | H04L 63/0227 726/15 |
| 2009/0235089 A1* | 9/2009 | Ciet | G06F 21/577 713/190 |
| 2009/0249310 A1 | 10/2009 | Meijer et al. | |
| 2009/0249492 A1* | 10/2009 | Boesgaard Sorensen | G06F 21/556 726/27 |
| 2009/0254572 A1* | 10/2009 | Redlich | G06Q 10/06 |
| 2009/0282062 A1 | 11/2009 | Husic | |
| 2009/0292791 A1 | 11/2009 | Livshits | |
| 2010/0058301 A1* | 3/2010 | Myles | G06F 8/41 717/142 |
| 2010/0083072 A1* | 4/2010 | Prasad | H03M 13/271 714/762 |
| 2010/0107245 A1* | 4/2010 | Jakubowski | G06F 21/52 726/22 |
| 2010/0172494 A1* | 7/2010 | Henson | G06F 21/64 380/28 |
| 2010/0180346 A1 | 7/2010 | Nicolson et al. | |
| 2010/0235637 A1 | 9/2010 | Lu et al. | |
| 2010/0235910 A1 | 9/2010 | Ku et al. | |
| 2010/0257354 A1 | 10/2010 | Johnston et al. | |
| 2010/0262780 A1 | 10/2010 | Mahan et al. | |
| 2010/0281459 A1* | 11/2010 | Betouin | G06F 8/423 717/106 |
| 2011/0015917 A1 | 1/2011 | Wang et al. | |
| 2011/0022846 A1 | 1/2011 | Ginter et al. | |
| 2011/0035733 A1* | 2/2011 | Horning | G06F 21/14 717/140 |
| 2011/0107077 A1 | 5/2011 | Henderson et al. | |
| 2011/0129089 A1* | 6/2011 | Kim | G06F 21/6227 380/284 |
| 2011/0131416 A1 | 6/2011 | Schneider | |
| 2011/0154021 A1 | 6/2011 | McCann et al. | |
| 2011/0167407 A1* | 7/2011 | Betouin | G06F 21/14 717/120 |
| 2011/0178973 A1 | 7/2011 | Lopez et al. | |
| 2011/0255689 A1 | 10/2011 | Bolotov | |
| 2011/0296391 A1 | 12/2011 | Gass et al. | |
| 2011/0302424 A1* | 12/2011 | Horne | G06F 11/3624 713/187 |
| 2011/0307954 A1 | 12/2011 | Melnik et al. | |
| 2012/0011262 A1 | 1/2012 | Cheng et al. | |
| 2012/0022942 A1* | 1/2012 | Holloway | H04L 63/1458 705/14.49 |
| 2012/0096116 A1 | 4/2012 | Mislove et al. | |

(56) References Cited

U.S. PATENT DOCUMENTS

| | | | |
|---|---|---|---|
| 2012/0124372 A1 | 5/2012 | Dilley | |
| 2012/0198528 A1 | 8/2012 | Baumhof | |
| 2013/0067225 A1* | 3/2013 | Shochet | G06F 21/6209 713/165 |
| 2013/0152071 A1* | 6/2013 | Asher | G06F 8/61 717/174 |
| 2013/0198607 A1 | 8/2013 | Mischook et al. | |
| 2013/0232234 A1 | 9/2013 | Kapur et al. | |
| 2013/0232343 A1* | 9/2013 | Horning | G06F 21/14 713/190 |
| 2013/0232578 A1* | 9/2013 | Chevallier-Mames | G06F 21/10 726/26 |
| 2013/0263264 A1 | 10/2013 | Klein et al. | |
| 2014/0013427 A1* | 1/2014 | Liem | G06F 21/572 726/22 |
| 2014/0040787 A1 | 2/2014 | Mills et al. | |
| 2014/0089786 A1 | 3/2014 | Hashmi | |
| 2014/0165197 A1* | 6/2014 | Ur | G06F 21/56 726/23 |
| 2014/0281535 A1 | 9/2014 | Kane et al. | |
| 2014/0282872 A1* | 9/2014 | Hansen | H04L 63/102 726/3 |
| 2014/0283069 A1* | 9/2014 | Call | H04L 63/1425 726/23 |
| 2015/0039962 A1* | 2/2015 | Fonseka | H03M 13/2909 714/755 |
| 2015/0074803 A1* | 3/2015 | Johnson | G06F 21/14 726/22 |
| 2015/0180509 A9* | 6/2015 | Fonseka | H03M 13/275 714/756 |
| 2015/0195305 A1* | 7/2015 | He | H04L 63/0428 713/160 |
| 2015/0213239 A1* | 7/2015 | Johnson | G06F 21/14 726/26 |
| 2015/0278491 A1* | 10/2015 | Horning | G06F 21/14 726/26 |
| 2015/0350243 A1* | 12/2015 | Call | H04L 63/1441 726/23 |
| 2016/0191351 A1 | 6/2016 | Smith | |
| 2016/0197945 A1* | 7/2016 | Call | H04L 63/1425 726/23 |
| 2017/0264623 A1 | 9/2017 | Ficarra et al. | |

FOREIGN PATENT DOCUMENTS

| | | |
|---|---|---|
| WO | WO00/72119 | 11/2000 |
| WO | 02088951 | 11/2002 |
| WO | WO02/093369 | 11/2002 |
| WO | 2004109532 | 12/2004 |
| WO | 2008095018 | 8/2008 |
| WO | 2008095031 | 8/2008 |
| WO | 2008130946 | 10/2008 |
| WO | WO2010/046314 | 4/2010 |
| WO | 2012/051452 | 4/2012 |
| WO | 2012/087650 | 6/2012 |
| WO | 2013091709 | 6/2013 |

OTHER PUBLICATIONS

CodeSealer, "CodeSealer," codesealer.com [online] 2013 [captured Aug. 29, 2013]. Retrieved from the Internet: <URL: http://web.archive.org/web/20130829165031/http://codesealer.com/technology.html>, 2 pages.

Cova et al., "Detection and Analysis of Drive-by-Download Attacks and Malicious JavaScript Code," World Wide Web Conference Committee, Apr. 26-30, 2010. Retrieved from the Internet: <URL: http://www.cs.ucsb.edu/~vigna/publications/2010_cova_kruegel_vigna_Wepawet.pdf>, 10 pages.

Currie et al., "In-the-wire authentication: Protecting client-side critical data fields in secure network transactions," 2nd International Conference on Adaptive Science and Technology, 2009, pp. 232-237.

Dougan et al., "Man in the browser attacks," International Journal of Ambient Computing and Intelligence, Jan.-Mar. 2012, pp. 29-39.

Egele et al., "Defending Browsers against Drive-by Downloads: Mitigating Heap-spraying Code Injection Attacks," Detection of Intrusions and Malware, and Vulnerability Assessment Lecture Notes in Computer Science, 5587:88-106. Retrieved from the Internet: <URL: http://anubis.seclab.tuwien.ac.at/papers/driveby.pdf>, 19 pages, 2009.

Entrust, "Defeating Man-in-the-Browser Malware," Entrust.com [online] Sep. 2012 [retrieved Oct. 15, 2013]. Retrieved from the Internet: <URL: http://download.entrust.com/resources/download.cfm/24002/>, 18 pages.

Marcus and Sherstobitoff, "Dissecting Operation High Roller," McAfee [online] 2012 [retrieved on Oct. 15, 2013]. Retrieved from the Internet: <URL: http://www.mcafee.com/us/resources/reports/rp-operation-high-roller.pdf>, 20 pages.

Oh, "Recent Java exploitation trends and malware," Black Hat USA 2012, Retrieved from the Internet: <URL: https://media.blackhat.com/bh-us-12/Briefings/Oh/BH_US_12_Oh_Recent_Java_Exploitation_Trends_and_Malware_WP.pdf>, 27 pages.

RSA, "RSA Offers Advanced Solutions to Help Combat Man-In-The-Browser Attacks," rsa.com [online] May 18, 2010 [captured Nov. 11, 2011]. Retrieved from the Internet: <URL: http://web.archive.org/web/20111111123108/http://rsa.com/press_release.aspx?id=10943>, 3 pages.

Rutkowska, "Rootkits vs. Stealth by Design Malware," Black Hat Europe, 2006. Retrieved from the Internet: <URL: http://www.blackhat.com/presentations/bh-europe-06/bh-eu-06-Rutkowska.pdf> 44 pages.

SafeNet, "Prevent Financial Fraud and Man-in-the-Browser Attacks," safenet-inc.com [online] [retrieved on Oct. 15, 2013]. Retrieved from the Internet: <URL: http://www.safenet-inc.com/solutions/data-protection/financial-services/financial-fraud-man-in-the-browser-attacks/>, 1 page.

Sood and Enbody, "A Browser Malware Taxonomy," Virus Bulletin, Jun. 2011. Retrieved from the Internet: <URL: http://www.secniche.org/released/VB_BRW_MAL_TAX_AKS_RJE.pdf>, 5 pages.

Sood and Enbody, "Browser Exploit Packs—Exploitation Tactics," Virus Bulletin Conference, Oct. 2011, Retrieved from the Internet: <URL: http://www.secniche.org/papers/VB_2011_BRW_EXP_PACKS_AKS_RJE.pdf>, 9 pages.

Sood et al., "The Art of Stealing Banking Information—Form grabbing on Fire," Virus Bulletin, Nov. 2011, Retrieved from the Internet: <URL: http://www.virusbtn.com/virusbulletin/archive/2011/11/vb201111-form-grabbing>, 5 pages.

Team Cymru, "Cybercrime—an Epidemic," Queue, 4(9):24-35, Nov. 2006, Retrieved from the Internet: <URL: http://trygstad.rice.iit.edu:8000/Articles/Cybercrime%20-%20An%20Epidemic%20-%20ACM%20Queue.pdf>, 3 pages.

Trusteer, "Trusteer Rapport for Online Banking," [online] 2013 [captured May 11, 2013]. Retrieved from the Internet: <URL: http://web.archive.org/web/20130511162210/http://www.trusteer.com/products/trusteer-rapport-for-online-banking>, 2 pages.

Vasco, "Hardened Browser," vasco.com [online] [retrieved on Oct. 15, 2013]. Retrieved from the Internet: <URL: http://www.vasco.com/products/client_products/pki_digipass/hardened_browser.aspx>, 2 pages.

Li et al., "WebShield: Enabling various web defense techniques without client side modifications," In Proceedings of the 18th Annual Network and Distributed System Security Symposium (NDSS), 2011, 18 pages.

Matsunaka et al., "Detecting and Preventing Drive-By Download Attack via Participative Monitoring of the Web," in Information Security (Asia JCIS), 2013 Eighth Asia Joint Conference on Information Security, pp. 48-55. doi: 10.1109/ASIAJCIS.2013.15.

Sedaghat et al., "On-the-fly web content integrity check boosts users' confidence"; Nov. 2002; Communications of the ACM, vol. 45 Issue 11; Publisher: ACM; pp. 33-37.

Zhou, U.S. Appl. No. 15/157,704, filed May 18, 2016, Office Action, dated Oct. 6, 2016.

Sirer, et al., "Design and implementation of a distributed virtual machine for networked computers"; ACM SIGOPS Operating Systems, 1999, p. 202-216; 15 pages, 1999, 15.

(56) References Cited

OTHER PUBLICATIONS

International Preliminary Report on Patentability for PCT/US17/21409, dated May 23, 2017.
CTNF, dated Aug. 4, 2017, re: Siying Yang, U.S. Appl. No. 15/242,062, filed Aug. 19, 2016.
NOA, dated Sep. 18, 2017, re: Xinran Wang, U.S. Appl. No. 14/286,324, filed May 23, 2014.

* cited by examiner

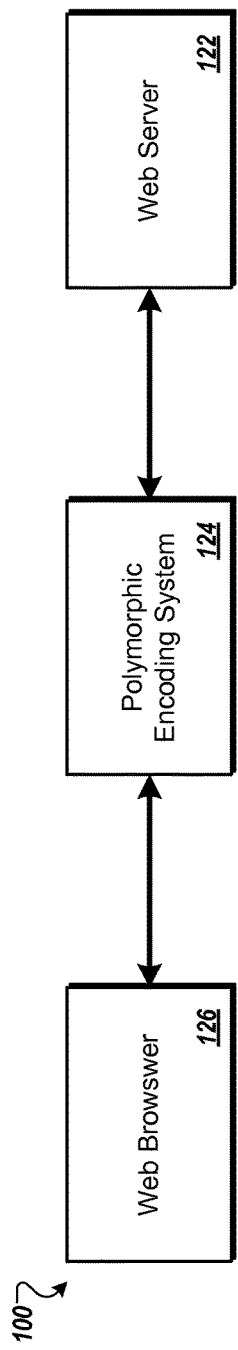
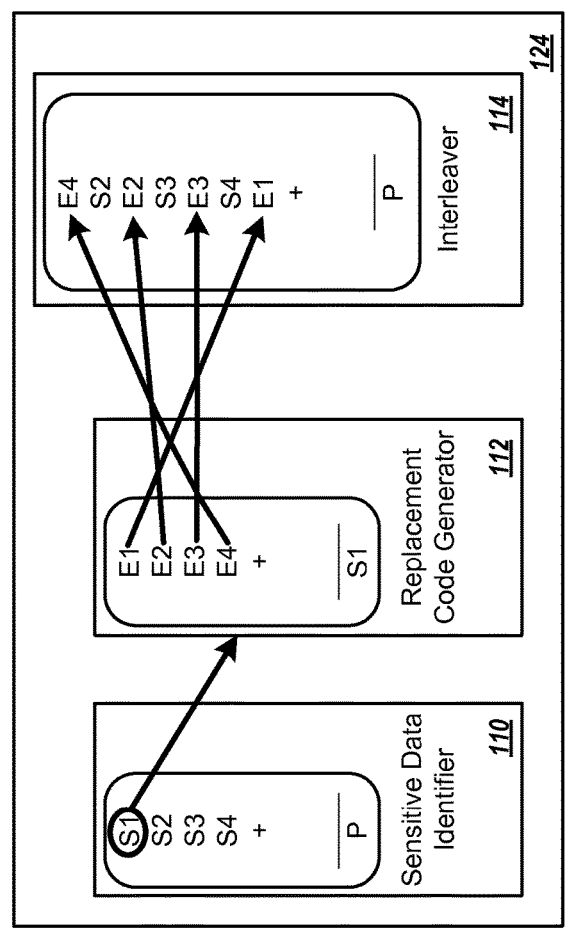
FIG. 1A
FIG. 1B

ENCODING OF SENSITIVE DATA

TECHNICAL FIELD

This document relates to computer security and interference with malware.

BACKGROUND

Research indicates that a large share of web traffic involves computer bots—many are malware. Bot activities include content scraping, reconnaissance, credential stuffing, creating fake accounts, comment spamming, and similar activities. Bots can impose an unnecessary load on any company trying to serve web content efficiently. More importantly, they can attempt to "learn" the operation of a web site so as to exploit it. As one example, malicious software (malware) may execute a "man in the browser" attack by intercepting communications that a user makes with a web site in a manner that makes the user believe that he or she is actually communicating with the web site. For example, malware may generate a display for a user who is visiting a banking site, where the display requests from the user information such as social security number, credit card number, other account numbers. An organization that operates the malware may then have such data sent to it, and may use the data to steal from the user, the web site operator, or both.

Various approaches have been taken to identify and prevent such malicious activity. For example, programs have been developed for operation on client computers or at the servers of the organizations that own and operate the client computer to detect improper activity.

SUMMARY

This document describes systems and techniques by which web code (e.g., HTML, CSS, and JavaScript) that a server system provides to client devices is modified before it is served over the internet, so as to make more difficult the exploitation of the code and the operator of the server system by clients that receive the code (including clients that are infected without their human users' knowledge). The modifications can be made to encode sensitive data, and may differ for different instances in which a web page and related content are served, whether to the same client computer or to different client computers. For example, a single expression or value in the code may be re-written as multiple expressions that, when executed, produce the initial value or expression. Where different code is served in response to each request, the expressions into which the initial value are resolved may also differ each time. The output of the code, when executed on the client computer, however, is the same for all such different versions of the served code so that a user at a client computer does not perceive a difference in the displayed web page. Specifically, two different users (or a single user in two different web browsing sessions) may be served slightly different code in response to the same requests, where the difference may be in implicit parts of the code that are not displayed so that the differences are not noticeable to the user or users.

The manner in which an initial value or expression is rewritten into multiple expressions capable of being executed on a client computer may take a variety of forms For example, different expressions, different numbers of expressions, and different ordering of the execution of the expressions may all be varied to interfere with malware. Also, these different parameters may be varied so as to be different from one serving of the code to the next. Such variation, which may be termed "polymorphism" of the code, may help create a moving target against which malware needs to apply itself. In one example, changing the code that is served to client devices in an essentially random manner (i.e., a manner that effectively interferes with the ability of malware that has analyzed serving n from inferring something useful about serving n+x) each time the code is served can deter malicious code executing on the client computers (e.g., Man in the Browser bot) from interacting with the served code in a predictable way so as to trick a user of the client computer into providing confidential financial information and the like. Moreover, external programs generally cannot drive web application functionality directly, and so preventing predictable interaction with served code can be an effective mechanism for preventing malicious computer activity.

As described here, the techniques transform values or expressions, such as a cleartext string, a Javascript object, or a Javascript code snippet into another Javascript snippet that is the equivalent to the input after it is executed (i.e., it produces an identical displayed output). The encoding is dynamic and random, which means that the encoding generates different output code each time given the same input (though the outputs may repeat periodically as long as that repetition is not frequent enough to allow malware to predict the output or readily obtain the repeated output). Because the encoded output code is still presented as cleartext, it may not be able to prevent a human from ascertaining sensitive data, but it may make it very difficult for a malicious party to write a computer program to extract the sensitive data automatically.

Likewise, other forms of computer attacks can also be prevented or deterred by the web code transformations described in this document. Some of these attacks include: (a) denial of service attacks, and particularly advanced application denial of service attacks, in which a malicious party targets a particular functionality of a website (e.g., a widget or other web application) and floods the server with requests for that functionality until the server can no longer respond to requests from legitimate users; (b) rating manipulation schemes in which fraudulent parties use automated scripts to generate a large number of positive or negative reviews of some entity such as a marketed product or business in order to artificially skew the average rating for the entity up or down; (c) fake account creation in which malicious parties use automated scripts to establish and use fake accounts on one or more web services to engage in attacks ranging from content spam, e-mail spam, identity theft, phishing, ratings manipulation, fraudulent reviews, and countless others; (d) fraudulent reservation of rival goods, by which a malicious party exploits flaws in a merchant's website to engage in a form of online scalping by purchasing all or a substantial amount of the merchant's inventory and quickly turning around to sell the inventory at a significant markup; (e) ballot stuffing, in which automated bots are used to register a large number of fraudulent poll responses; (f) website scraping, in which both malicious parties and others (e.g., commercial competitors), use automated programs to obtain and collect data such as user reviews, articles, or technical information published by a website, and where the scraped data is used for commercial purposes that may threaten to undercut the origin website's investment in the scraped content; and (g) web vulnerability assessments, in which malicious parties scan any number of websites for security vulnerabilities by analyzing the web code and structure of each site.

The systems, methods, and techniques for web code modifications described in this paper can, in certain implementations, prevent or deter one or more of these types of attacks. For example, transforming sensitive data by replacing expressions with a set of equivalent expressions and then interleaving the expressions in the set of equivalent expressions can cause the effectiveness of bots and other malicious automated scripts to be substantially diminished.

The modification of code that is described in more detail below may be carried out by a security system that may supplement a web server system, and may intercept requests from client computers to the web server system and intercept responses from web servers of the system when they serve content back to the client computers (including where pieces of the content are served by different server systems). The modification may be of static code (e.g., HTML) and of related executable code (e.g., JavaScript) in combination. For example, the names of certain elements on a web page defined via HTML may be changed, as may references to items external to the HTML (e.g., CSS and JavaScript code). An expression may be rewritten as an equivalent expression or multiple expressions. For example, the expression "var y=2" may be rewritten as the following set of expressions: "var a=10"; "var b=8"; and "y=a−b". As shown in this example, the combination of the three expressions in the set of expressions produces the same result as the original expression—that is, an assignment of the value 2 to the variable y. Such rewriting, or transforming, of code may occur by first identifying data present in code that is to be served to the client computer (e.g., HTML, CSS, and JavaScript) and grouping such occurrences of sensitive data for further processing (e.g., by generating flags that point to each such element or copying a portion of each such element). The identified data may be identified as sensitive or potentially sensitive or simply data that should be rewritten before being served. Processing of the data may occur by modifying each element throughout different formats of code, such as changing an expression in the manner above each time that name occurs in a parameter, method call, DOM operation, or elsewhere. Next, further processing may occur that comprises interleaving the set of elements throughout the new code. Such a process may be repeated each time a client computer requests code, and the modifications may be different for each serving of the same code.

In certain instances, the analysis to identify values or expressions that can be rewritten without affecting the operation of the code may be performed once, and a map to occurrences of such values or expressions in the mode may be generated, and then used for each serving of the code to locate the occurrences, so that they may be altered throughout the code in a consistent manner that does not break the code. Such analyze-once, transform-many approaches may lessen the computational load for such a system and allow greater scaling of the system to larger web server systems with high volume requirements.

Such modification of the served code can help to prevent bots or other malicious code from exploiting or even detecting weaknesses in the web server system. For example, the names of functions or variables may be changed in various random manners each time a server system serves the code. As noted above, such constantly changing modifications may interfere with the ability of malicious parties to identify how the server system operates and web pages are structured, so that the malicious party cannot generate code to automatically exploit that structure in dishonest manners. Such techniques may create a moving target that can prevent malicious organizations from reverse-engineering the operation of a web site so as to build automated bots that can interact with the web site, and potentially carry out Man-in-the-Browser and other Man-in-the-Middle operations and attacks.

The techniques discussed here may be carried out by a server subsystem that acts as an adjunct to a web server system that is commonly employed by a provider of web content. For example, as discussed in more detail below, an internet retailer may have an existing system by which it presents a web storefront at a web site (e.g., www.examplestore.com), interacts with customers to show them information about items available for purchase through the storefront, and processes order and payment information through that same storefront. The techniques discussed here may be carried out by the retailer adding a separate server subsystem (either physical or virtualized) that stands between the prior system and the internet. The new subsystem may act to receive web code from the web servers (or from a traffic management system that receives the code from the web servers), may translate that code in random manners before serving it to clients, may receive responses from clients and translate them in the opposite direction, and then provide that information to the web servers using the original names and other data. In addition, such a system may provide the retailer or a third party with whom the retailer contracts (e.g., a web security company that monitors data from many different clients and helps them identify suspect or malicious activity) with information that identifies suspicious transactions. For example, the security subsystem may keep a log of abnormal interactions, may refer particular interactions to a human administrator for later analysis or for real-time intervention, may cause a financial system to act as if a transaction occurred (so as to fool code operating on a client computer) but to stop such a transaction, or any number of other techniques that may be used to deal with attempted fraudulent transactions.

In one implementation, a computer-implemented method is disclosed that includes identifying a piece of data for serving from a server system to a client device that is remote from the server system, the piece of data being part of executable code requested from the server from the client device; creating a plurality of expressions that, when executed, provide a result that corresponds to the piece of data; and providing, to the client device and as part of the executable code, the plurality of expressions along with code for executing the plurality of expressions, so that when the plurality of expressions are executed on the client device, the identified piece of data is returned on the client device without a need to serve the identified piece of data to the client device. The method can include performing a permutation on the plurality of expressions so that the plurality of expressions or ordered in the executable code in an order different than they were created. The order of the expressions can be selected randomly as part of the permutation.

In some aspects, the method can include creating one or more additional expressions whose executed results are not used by other code that is part of the executable code served to the client device; and providing to the client device the plurality of expressions with the one or more additional expressions. Also, the method can include identifying, in the piece of data, data that needs to be kept away from malware that may be in the client device, and wherein creating a plurality of expressions comprises creating one or more replacement statements that when executed, provide a result that corresponds to the potentially sensitive data. The replacement statements can comprise one or more expressions that do not execute on the client device when the executable code is executed.

In certain aspects, the method can further include identifying, in the piece of data, a first expression and a second expression to be replaced, wherein creating a plurality of expressions comprises creating a first set of replacement expressions corresponding to the first expression and a second set of expressions corresponding to the second expressions; and interleaving the replacement expressions of the first set of replacement expressions with the replacement expressions of the second set of replacement expressions, wherein the plurality of expressions provided to the client device comprise the interleaved replacement expressions.

In other aspects, creating a plurality of expressions comprises creating a first set of replacement expressions; identifying a first replacement expression in the first set of replacement expressions; creating a second set of replacement expressions that, when executed, provide a result that corresponds to the first replacement expression; and replacing the first replacement expression with the second set of replacement expressions. The piece of data to be served comprises formats of code in HTML, CSS, and JavaScript, and wherein each of the formats interoperates with the other formats.

In another implementation, a computer-implemented method is disclosed that comprises receiving, from a server system, web content comprising original code, wherein the web content is requested by a client device that is remote from the server system; identifying a piece of data in the code; creating a plurality of expressions that, when executed, provide a result that corresponds to the piece of data; generating modified code comprising the original code with the piece of data replaced with the plurality of expressions; and providing the modified code to the client device, wherein, when executed, the modified code provides a result that corresponds to the original code. In some aspects, generating modified code comprises interleaving the plurality of expressions into the original code with the identified piece of data removed. Also, in some aspects, the plurality of expressions is created in a first ordering, and the plurality of expressions is interleaved into the original code so that the plurality of expressions maintains the first ordering. In other aspects, the plurality of expressions are created in a first ordering, and the plurality of expressions are interleaved into the original code so that the plurality of expressions are in a second ordering that is different than the first ordering. In yet other aspects, the plurality of expressions includes one or more junk expressions that do not execute. In some aspects, the method further comprises selecting a first expression among the plurality of expressions; and creating a second plurality of expressions that, when executed, provide a result that corresponds to the selected first expression, wherein the generated modified code comprises the original code with the piece of data replaced with the plurality of expressions, with the selected first expression replaced with the second plurality of expressions.

In another implementation, a computer system for recoding web content served to client computers is disclosed that comprises an interface for receiving information from a web server system configured to provide computer code in multiple different formats in response to requests from client computing devices; and a security intermediary that is arranged to (i) receive the computer code from the interface before the computer code is provided to the client computing devices, (ii) identify a piece of data in the computer code that is to be replaced; (iii) create a plurality of expressions that, when executed, provide a result that corresponds to the piece of data; and (iv) provide the plurality of expressions to the client computing devices with code for executing the plurality of expressions. In some aspects, the piece of data in the computer code that is to be replaced is identified as potentially sensitive data. In other aspects, the security intermediary is further arranged to perform a permutation of the plurality of expressions. In yet other aspects, the plurality of expressions comprise one or more expressions that do not execute. In yet another aspect, the security intermediary is further arranged to interleave the plurality of expressions with the code of executing the plurality of expressions.

Other features and advantages will be apparent from the description and drawings, and from the claims.

BRIEF DESCRIPTION OF THE DRAWINGS

FIG. 1A depicts a general overview of a system for requesting, modifying, and serving web content.

FIG. 1B depicts a schematic diagram of an encoding system that modifies requested web content.

Like reference numbers and designations in the various drawings indicate like elements.

DETAILED DESCRIPTION

Figure 1:
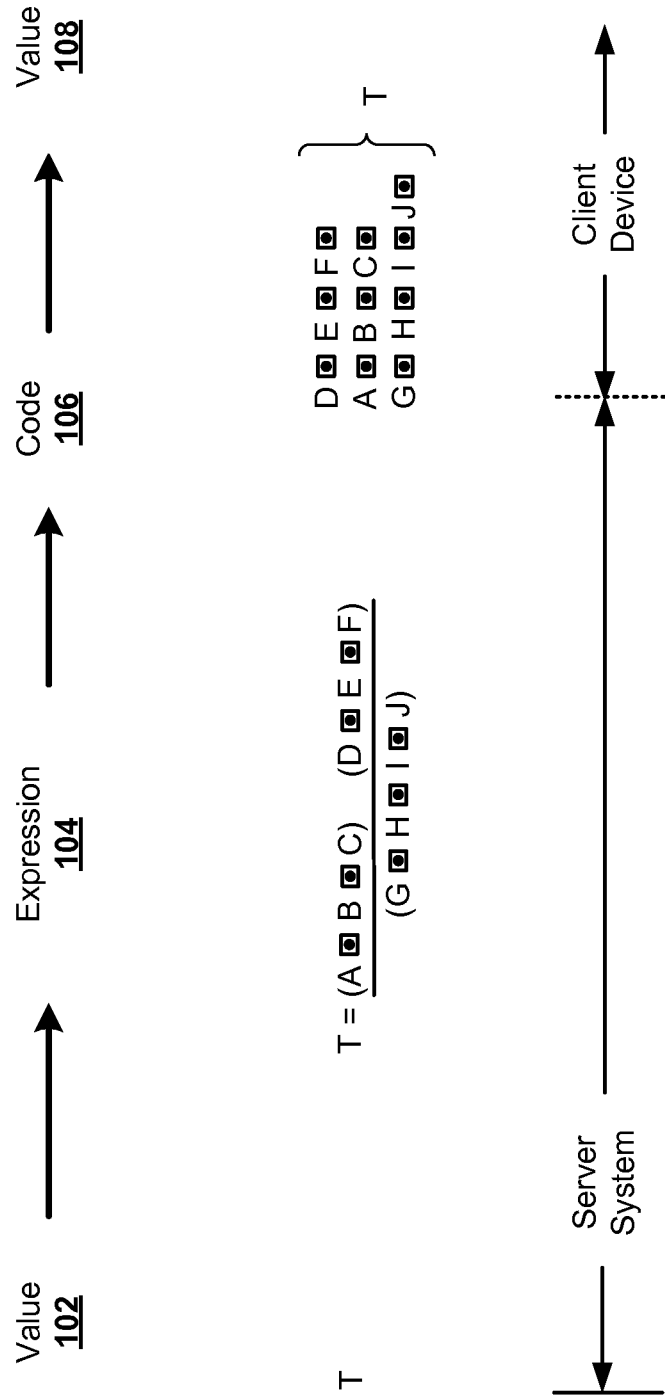
FIG. 1 is a conceptual diagram showing transformation of a value into multiple expressions that execute back to the value.

FIG. 1 is a conceptual diagram showing transformation of a value into multiple expressions that execute back to the value. In general, the diagram attempts to show at a high level how initial representations in code can be rewritten as multiple representations that together can be executed on a client device to return the initial representation. The multiple representations, however, can be difficult for automated malware to analyze because they can not easily be matched to a template, can be scattered throughout the code in appropriate circumstances, and can be constantly changed, both in their values and in their ordered and locations in the code.

The diagram depicts a process, flowing from left-to-right. The process starts with a value 102, which may take a variety of forms. The value may be a simple string or number in plaintext form. Such value may be found by analysis of web code served by a web server system and provided to an intermediate security system that is tasked with recoding portions of the served code where the recoding will not affect the functionality of the code when it is executed on client devices.

At 104, the intermediate security system identifies a relatively complex expression that will resolve to the value. For clarity of explanation, the expression is shown here in the form of a pseudo-equation. In the equation, operations are shown as a box surrounding a dot, to represent that any appropriate operation may be used. Parentheses are used to indicate grouping of operations, and the ability to have the relative groups combined with each other out of the order they are shown in the equation. Thus, at 106, the three main groups are each converted into code snippets to represent the relevant sub-expressions, and then the order in which those sub-expressions are evaluated is changed—where the second grouping from the formula is evaluated first in the code, then the first, and then the third. Additional code may be generated to evaluate the results of the three groupings together with each other.

The code generated at 106 may then be inserted into the code received from the web server system and may be served to a client device that requested the code. At 108, that code is executed at the client device, such as using a web browser, and such execution generates the initial value 108 or a value that is equivalent to the initial value. In subsequent servings of the code, the value "T" may be resolved into very different lines of code and expressions.

In this manner, then, the process shown here is able to replace original code with different code that serves as a proxy for the original code, and that reaches the same result as the original code when it is executed by the standard environment (e.g., standard JavaScript run-time) on a client device.

FIG. 1A depicts an overview of a system 100 for encoding web content served from a web server 122 to a polymorphic encoding system 124 (or simply, encoding system) and to a web browser 126. In general, the system 100 represents a high-level depiction of the system in FIG. 1.

The polymorphic encoding system 124 receives web content from a web server 122 that is to be served to a web browser 126 at, for example, a client device. Prior to serving the web content to the web browser 126, the polymorphic encoding system 124 identifies and encodes potentially sensitive data. Web content that is handled by the system 100 may include, for example, HTML, CSS, JavaScript, and other program code associated with the content or transmission of web resources such as a web page that may be presented at a client computer (or many different requesting client computers).

FIG. 1B depicts various parts of the encoding system 124 of FIG. 1A. In general, these components operate to transform incoming computer code so as to convert values or expressions into multiple additional expressions that resolve to the original values or expressions when they are executed as part of the code.

In the figure, a sensitive data identifier 110 parses code to identify sensitive data or potentially sensitive data, including data that can be recoded without affecting the functionality of the code when it is executed. In some instances, data identifier 110 may broadly identify data that is to be replaced, regardless of whether the data is identified as sensitive in nature. In this example, program code P may comprise statements S1, S2, S3, and S4. In this example, the sensitive data identifier 110 identifies statement S1 as potentially sensitive data.

Various methods may be used for identifying potentially sensitive data. For example, data associated with a form to be filled out or with particular fields or fieldnames in a form may be identified. Also, an operator of a security system may study the code served by a particular organization and may flag particular fields or other elements that are frequently served by the organization and are of a sensitive nature. The sensitive field identifier 110 may then use a list of fields or other information generated by such an analysis to locate sensitive fields in other pages of web code to be served by the same organization.

The sensitive data from the web server may be typically presented in cleartext form. A replacement code generator 112 generates code that replaces such potentially sensitive data. The generated code, when executed, generates the same output as the originally-identified potentially sensitive code. In this example, replacement code generator 112 generates four statements E1, E2, E3, and E4 that, when executed, produce the same output as statement S1. Interleaver 114 takes the replacement code statements E1, E2, E3, and E4, and interleaves the replacement code statements into other programmatic statements that are already part of program P, or statements that have been generated as replacement code for other statements in the code. The interleaving process may be random (though avoiding any placement that would break the code) and may result in a different ordering of statements in response to two different requests. The resulting program with the interleaved statements, when executed, produces the same functional output as program P.

The data transferred from the encoding system 124 to the web browser 126 may be, for example, in the form of obfuscated JavaScript code with the sensitive data hidden within the code. Specific example methods for encoding the sensitive data are described below with respect to FIGS. 3A-3G. When the sensitive data passes through the encoding system 124, the encoding system 124 identifies and extracts the sensitive data and then modifies the code. The modified code is then incorporated in the original web content, replacing the sensitive data.

Figure 2:
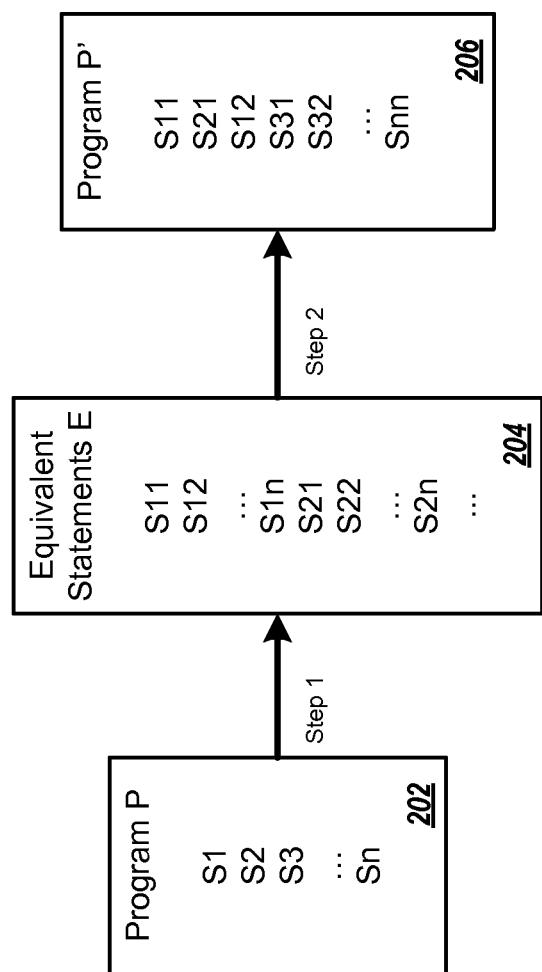
FIG. 2 depicts an overview of a method for modifying program code.

FIG. 2 depicts an example of how program code P 202 may be modified, or encoded, into program code P' 206. In general, the illustrated process involves identifying a number of operations or statements that may be joined together and transformed into code that, when executed under a standard programming environment (e.g., a standard run-time implementation), will produce an original starting value or expression.

While the code of program P 202 and program P' 206 are not identical, the output of each of program P 202 and program P' 206, when executed (e.g., via a web browser), are the same. Program P 202 represents any appropriate web content, such as HTML, CSS, JavaScript, and other program code. Program P 202 comprises a set of n statements, {S1, S2, S3, . . . , Sn}. The statement Si in the set of statements may be potentially sensitive data or content that is confirmed to be sensitive in nature. In some instances, the statement Si in the set of statements may include statements that are identified as needing to be replaced. Each statement, Si, may be a line of code or expression in the program. In Step 1, each of the statements, Si, is rewritten as a set of statements {Si1, Si2, Si3, Si4 . . . } that, collectively, is executed as the equivalent of the individual statement Si, as described in further detail below with respect to FIGS. 3A-3F. In this manner, after Step 1 is complete for each statement, Si, in Program P 202, a set of equivalent statements E 204 for Program P 202 is generated. That is, the set of equivalent statements E 204 comprises n sets of equivalent statements for each statement Si, in Program P 202. For example, the statement S1 is replaced with the set of equivalent statements {S11, S12, S13, S14 . . . }. The number of statements in each set of equivalent statements need not be the same. Then, in Step 2, the various statements in the set of equivalent statements E 204 are interleaved, as described below with respect to FIG. 3G.

FIGS. 3A-3F show examples of equivalent statement replacement. In general, the figures show manners in which a single line of code for expressing a variable-assigning and/or mathematical relationship can be expressed instead by multiple lines of code that can be executed in a particular order to reach the initial result. Although numeric functions are shown in the examples, here, other data may be similarly treated. For example, an alphanumeric string may be transformed through multiple operations, so that the starting point is a string different than what the web server system provided, but that ends up in generating the same string when the code is executed by a web browser.

Figure 3A:
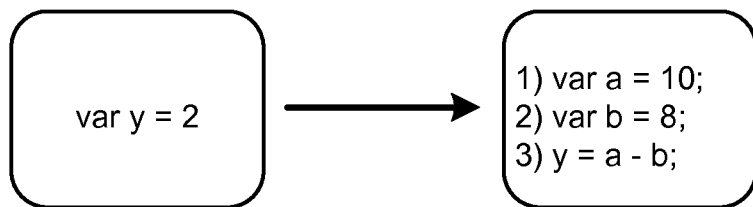
FIG. 3A-3G depict various examples for modifying code for web content.

Referring to FIG. 3A, a constant number in Javascript can be replaced by an equivalent Javascript expression. There exist numerous ways to replace a constant number. For example, the number 1 can be written as (3−2) or as (0+1), and the number 24 can be written as the expression (4*6) or (30−6). To generate essentially random expressions for number y, the system can first use a random generator to generate a random number, for example, x, and then replace the number y with (x−(x−y)), which appears in the code to be different than y but is functional equivalent of y when executed. FIG. 3A shows an example of this equivalent statement replacement where the statement "var y=2" is replaced with the set of statements {var a=10; var b=8; y=a−b}. While FIG. 3A shows a sum (or subtraction) operation, generally, any appropriate type of JavaScript operation (e.g., sum, multiply, divide) or function that returns a number (e.g., String.length( ), Array.length( )) may be used. Other types of constants, such as Boolean, string, array, and object, can be replaced with equivalent statements using a similar approach.

Figure 3B:
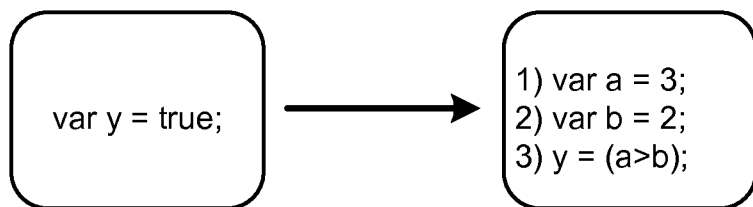

FIG. 3B shows an example of an equivalent statement replacement of a Boolean operation, as one such example. Where the initial statement "var y=true" sets the value of variable y as "true," the set of equivalent statements comprises a set of three statements, which, when executed, equivalently result in the variable y being set as "true." In this example, the first two statements assign the values 3 and 2 to variables a and b, respectively. In doing so, the value of a is assigned to be greater than the value of b. Therefore, the statement "y=(a>b)" will always result in the value of y being set to "true." Notably, there exists a near infinite number of ways to create a set of statements (with any number of statements) that result in the value of y being assigned a value of "true." For instance, variables a and b can be assigned to any values as long as the value of a is larger than the value of b. Alternatively, other Boolean expressions can be used.

Figure 3C:
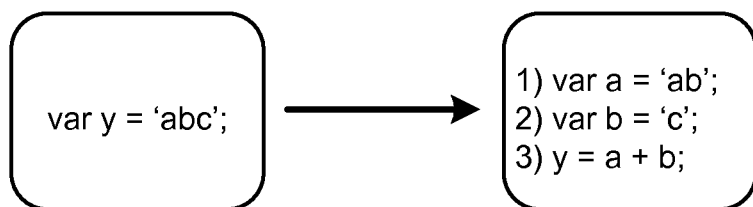

FIG. 3C shows an example of an equivalent statement replacement of a string constant. In the example, the statement "var y='abc'" is replaced with an equivalent set of statements comprising three statements. Collectively, when the equivalent set of statements is executed, the variable y is set as "abc". As with the examples discussed with respect to FIGS. 3A and 3B, an nearly infinite number of combinations exist to replace the initial statement. In other implementations, a string or the characters in a string may be assigned numeric values, and the operations performed on the numeric examples in the figures above and below may be applied, and then the resulting numeric value or values may be converted back into alphanumeric characters for a string. For example, the letter "a" may be assigned a value of 256 in a particular font definition, and the techniques discussed here may be used to break the value of 256 up into a plurality of expressions. When those expressions are executed at the client device, the number 256 may be returned, and then may be rendered as a glyph for the character set, as an "a."

Another method of equivalent statement replacement involves adding junk code or junk branches, and may be applied as an alternative or additionally to the other examples discussed here. The purpose of adding the junk code is to add "noise" to the code so that potential hackers or attackers cannot use the position of expressions in the code (e.g, line number or the nth statement) to locate a key function or variable. Junk code may be one or more statements that execute but have no effect on the execution of the rest of the program or the operation of the program. For instance, two simple assignment statements "j=4" and "k=3+j" may be a part of the set of statements that the replacement code generator creates. However, variables j and k not be present anywhere else in the program code, so that while the new code causes j to be assigned the value of 4 and k to be assigned the value of 7, variables j and k are not used anywhere else in the code and do not otherwise affect the operation or execution of the program code.

Figure 3D:
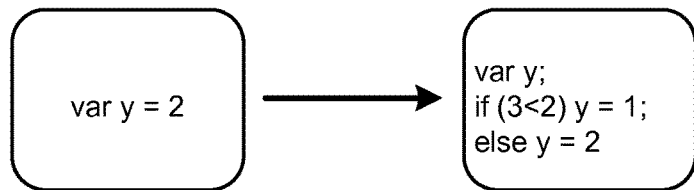

Alternatively, junk branches can be generated to add a level of obfuscation to the code. FIG. 3D shows an example of adding a junk branch to the statement "var y=2". Because the conditional statement "if (3<2)" is always false, junk branch "y=1" will never execute (e.g., the assignment of the value of 1 to y will never occur). The junk code or junk branches make it difficult for an attacker program to discern sensitive data from junk code or junk branches without more carefully parsing or analyzing the web content.

Figure 3E:
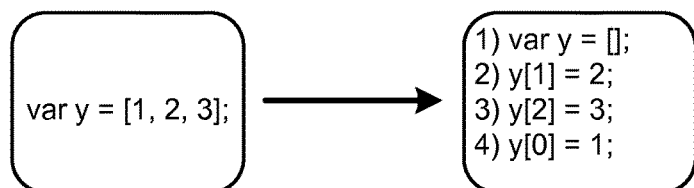

FIG. 3E shows an example of permutations of statements for a scenario in which equivalent statements do not require a strict order. For example, the statement "var y=[1, 2, 3]" creates an array with three elements. The collectively equivalent four statements "var y=[ ]", "y[1]=2", "y[2]=3", "y[0]=1" create the same array y regardless of the order that the latter three statements are executed. Where the order of the code does not matter, a larger number of potential random ways exist to rewrite the code. Specifically, for N such statements for which order does not matter, there are N! possible permutations. In the example shown in FIG. 3E, because there are three statements where the order is irrelevant, there are six possible ways to generate equivalent code in this manner. Permutation of statements may be used on an array, list string, or other collection data structure.

Figure 3F:
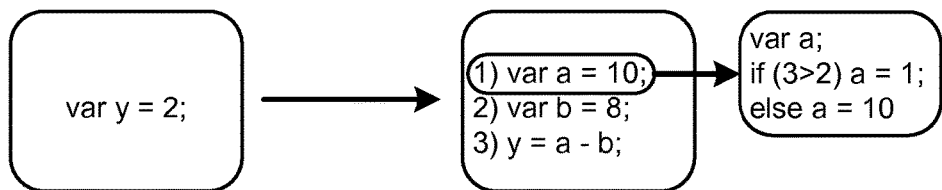

The encoding system may further employ recursive encoding. FIG. 3F illustrates an example of random recursive encoding where a constant is replaced with a random expression and then a junk branch is then added to one replacement statement. Specifically, first, a single statement "var y=2" is replaced with three separate statements. Then, one of the three statements is then replaced with other statements that add a junk branch, similar to the example shown in FIG. 3D. Additional recursive encoding may be employed. After applying random basic polymorphic encoding approaches a random number of times, a simple assignment statement, such as "var y=2" can be transformed into hundreds of lines of code.

Figure 3G:
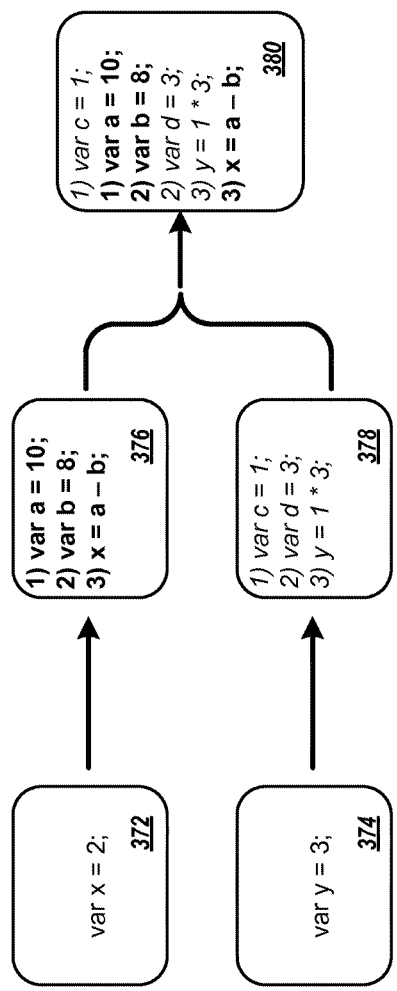

FIGS. 3A-3F illustrated various methods of producing equivalent statements 204. After performing such methods, an encoded program P' 206 can be generated by interleaving the equivalent statements E 204 with the rest of the code, as shown, for example, in FIG. 3G (and potentially identifying which of the statements can be included in either order relative to other of the statements). In FIG. 3G, two separate statements 372 and 374—"var x=2" and "var y=3"—are part of web content, for example, program code P 202. In a first step, a set of replacement statements 376 are generated for statement 372 and a set of replacement statements 378 are generated for statement 374. Then, in a second step, the individual expressions of the set of replacement statements 376 are interleaved with the individual expressions of the set of replacement statements 378 to form an encoded form of the original web content 380. FIG. 3G shows an example where the order of the statements in each of the sets of replacement statements 376, 378 matter (i.e., affect the outcome of the executed code), but the order of the statements between the two sets of replacement statements 376, 378 does not matter.

Figure 4:
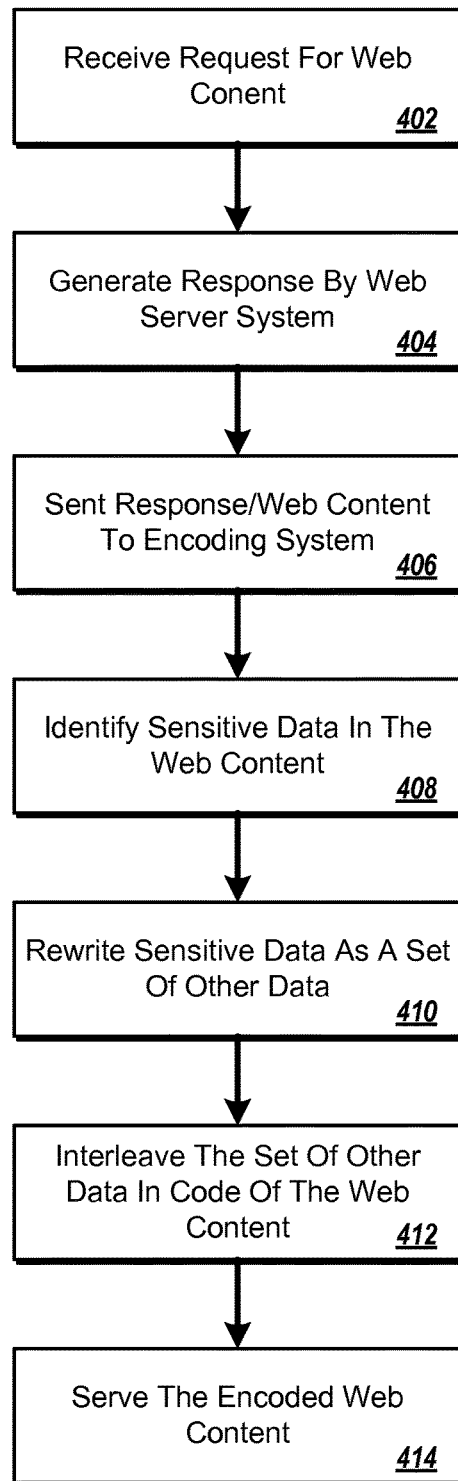
FIG. 4 is a flow diagram of a process for serving modified, or encoded, web content.

FIG. 4 is a flow diagram of a process for serving modified program code. In general, the process involves identifying items in content to be served to a client computer that may potentially include sensitive data, transforming the data dynamically and randomly into a set of other data, and incorporating the set of other data into the content in a manner so as to hide the potentially sensitive data.

The process begins at box 402, where a request for web content is received, such as from a client computer operated by an individual seeking to perform a banking transaction at a website for the individual's bank. The request may be in the form of an HTTP request and may be received by a load balancer operated by, or for, the bank. The load balancer may recognize the form of the request and understand that it is to be handled by a security system that the bank has installed to operate along with its web server system. The load balancer may thus provide the request to the security system, which may forward it to the web server system after analyzing the request (e.g., to open a tracking session based on the request), or may provide the request to the web server system and also provide information about the request to the security system in parallel.

At box 404, a response to the request is generated by the web server system. For example, the user may have requested to perform a funds transfer between accounts at the bank, where the funds are owned by the individual, and the response by the web server system may include HTML for a webpage on which the user can specify parameters for the transaction, along with JavaScript code and CSS code for carrying out such transactions at a web browser operated by the individual.

At box 406, the web server system sends the response to the request to an encoding system. The response may comprise the web content requested by the client computer. Included in the response may be potentially sensitive data, such as, for example, or account numbers, routing numbers, or other data relating to a banking transaction. At box 408, the encoding system receives the web content from the web server system and identifies potentially sensitive data in the web content.

At box 410, the encoding system generates code to replace the sensitive data. The sensitive data may be written as a set of replacement statements, which, when executed, are displayed the same as the sensitive data, resulting in no difference in appearance to a user requesting the web content. Various methods for rewriting or replacing the sensitive data are possible, including the methods described above with respect to FIGS. 3A-3F. The replacement of sensitive data may include replacing a single statement or expression in the web content, or it may include replacing numerous statements. At a minimum, however, a single statement, or expression, is replaced with a set of equivalent statements. The set equivalent statements may comprise one or more statements, which, when collectively executed, output the same result as the initial statement comprising sensitive data.

In some instances, the encoding system may identify a single statement assigning a constant value to contain sensitive data. In response, the encoding system may randomly generate a set of equivalent statements, which, collectively, make the same assignment, as illustrated, for example, in FIG. 3A. In other instances, the encoding system may identify a single statement containing sensitive data. In response, the encoding system may add one or more lines of junk code or junk branches. The purpose of the junk code is to add a layer of randomness to the code to prevent potential hackers from using the position (e.g., line number) of code to identify potentially sensitive data. When executed, the junk code has no visible effect on the displayed web content. Similarly, the encoding system may generate junk branches that appear to supplement the original statement or expression in the code. In some instances, the junk branches may comprise conditional statements or expressions that will never execute. An example of generating a junk branch is discussed above with respect to FIG. 3D. In that example, the conditional statement "if (3<2)" will never be true, so the assignment statement "y=1" will not occur and instead, the value 2 will always be assigned to y. Adding junk branches adds an additional level of obfuscation to the code that hampers a potential attacker's ability to target sensitive data.

In some instances, the encoding system may employ recursive coding, generating multiple "layers" of replacement code. An example of recursive coding is shown, for example, in FIG. 3F. In a first step, an assignment statement is replaced with three separate statements. In a second step, a junk branch is added to one of the three replacement statements. While the example shown in FIG. 3F shows only two "layers" of replacement code, any number of "layers" of replacement code may be generated.

After the encoding system generates replacement code, the method moves to box 412 where the various replacement statements are interleaved in the code of the web content. An example of the interleaving process is described above with respect to FIG. 3G. In that example, the encoder system first generates two sets of replacement code 376 and 378 in response to two separate input statements, "var x=2" and "var y=3", respectively. Then the individual statements of the two sets of replacement code 376 and 378 are interleaved. Each of the two sets of replacement code 376 and 378 has a particular ordering of the statements. In some instances, the ordering of the individual statements affects the execution of the code, while in other instances, the ordering does not affect the outcome. For example, in the set 376, statements "var a=10" and "var b=8" can be executed in any order with respect to one another but must be executed before the statement "x=a−b" is executed. Where the order of the statements is irrelevant, more variations of interleaved code are possible.

In some instances, the encoding system randomly and dynamically generates code to replace the sensitive data. That is, given the same input code (i.e., web content), the encoding system does not necessarily generate the same replacement code in response to two different requests for the web content. Furthermore, the approach for generating the replacement code may be different in response to two requests for the same web content. For example, in response to one request, the encoder system may replace a first statement with a set of three replacement statements that collectively result in the same result as the first statement, such as the example shown in FIG. 3A. In response to a second request for the same web content, the encoder system may replace the same first statement with a set of three different replacement statements that include a junk branch, such as the example shown in FIG. 3D. In both examples, the first statement to be replaced (presumably containing potentially sensitive data) is "var y=2", but the encoder system generates two different sets of replacement statements. In another example, the encoder may generate the same two sets of replacements statements in response to a first statement (e.g., "var y=2"), such as the replacement statements shown in FIG. 3A, but it may then interleave the code in a different order so that the resulting web code produced in response to the two requests are identical.

The process then serves the recoded web content at box 414, in familiar manners. Such a process may be performed repeatedly each time a client computer requests content, with the recoded content being different each time the content is served through the encoding system, including when identical or nearly identical content is requested in separate transactions by two different users or by the same user.

In addition, the code that is served by the encoding system may be supplemented with instrumentation code that runs on the computer browser and monitors interaction with the web page. For example, the instrumentation code may look for particular method calls or other calls to be made, such as when the calls or actions relate to a field in a form that is deemed to be subject to malicious activity, such as a client ID number field, a transaction account number field, or a transaction amount field. When the instrumentation code observes such activity on the client device, it will report that activity along with metadata that helps to characterize the activity, the process receives such reports from the instrumentation code and processes them, such as by forwarding them to a central security system that may analyze them to determine whether such activity is benign or malicious.

Figure 5:
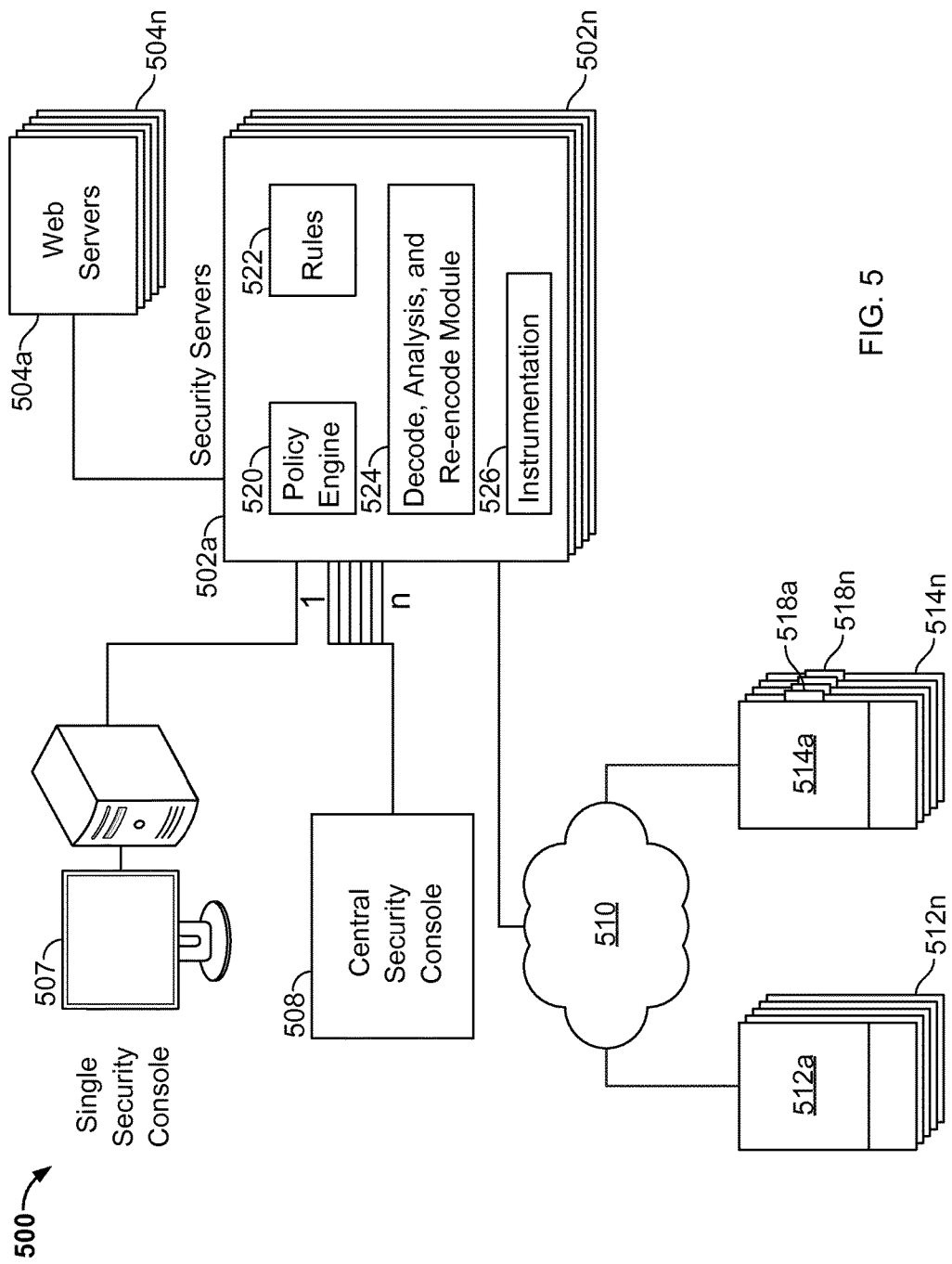
FIG. 5 shows a system for serving polymorphic code.

FIG. 5 shows a system 500 for serving polymorphic and instrumented code. Generally, polymorphic code is code that is changed in different manners for different servings of the code, in manners that do not affect the way in which the executed code is perceived by users. The goal is to create a moving target for malware that tries to determine how the code operates, but without changing the user experience. Instrumented code is code that is served, e.g., to a browser, with the main functional code and monitors how the functional code operates on a client device, and how other code may interact with the functional code and other activities on the client device. In certain implementations, the system 500 may identify values or expressions in the code that can be replaced with multiple other expressions that, when executed on a client device, resolve to the initial value or expressions.

The system 500 may be adapted to perform deflection and detection of malicious activity with respect to a web server system. Deflection may occur, for example, by the serving of polymorphic code, which interferes with the ability of malware to interact effectively with the code that is served. Detection may occur, for example, by adding instrumentation code (including injected code for a security service provider) that monitors activity of client devices that are served web code.

The system 500 in this example is a system that is operated by or for a large number of different businesses that serve web pages and other content over the internet, such as banks and retailers that have on-line presences (e.g., on-line stores, or on-line account management tools). The main server systems operated by those organizations or their agents are designated as web servers 504a-504n, and could include a broad array of web servers, content servers, database servers, financial servers, load balancers, and other necessary components (either as physical or virtual servers).

In this example, security server systems 502a to 502n may cause code from the web server system to be supplemented and altered. In one example of the supplementation, code may be provided, either by the web server system itself as part of the originally-served code, or by another mechanism after the code is initially served, such as by the security server systems 502a to 502n, where the supplementing code causes client devices to which the code is served to transmit data that characterizes the client devices and the use of the client devices. As also described below, other actions may be taken by the supplementing code, such as the code reporting actual malware activity or other anomalous activity at the client devices that can then be analyzed to determine whether the activity is malware activity.

The set of security server systems 502a to 502n is shown connected between the web servers 504a to 504n and a network 510 such as the internet. Although both extend to n in number, the actual number of sub-systems could vary. For example, certain of the customers could install two separate security server systems to serve all of their web server systems (which could be one or more), such as for redundancy purposes. The particular security server systems 502a-502n may be matched to particular ones of the web server systems 504a-504n, or they may be at separate sites, and all of the web servers for various different customers may be provided with services by a single common set of security servers 502a-502n (e.g., when all of the server systems are at a single co-location facility so that bandwidth issues are minimized).

Each of the security server systems 502a-502n may be arranged and programmed to carry out operations like those discussed above and below and other operations. For example, a policy engine 520 in each such security server system may evaluate HTTP requests from client computers (e.g., desktop, laptop, tablet, and smartphone computers) based on header and network information, and can set and store session information related to a relevant policy. The policy engine may be programmed to classify requests and correlate them to particular actions to be taken to code returned by the web server systems before such code is served back to a client computer. When such code returns, the policy information may be provided to a decode, analysis, and re-encode module, which matches the content to be delivered, across multiple content types (e.g., HTML, JavaScript, and CSS), to actions to be taken on the content (e.g., using XPATH within a DOM), such as substitutions, addition of content, and other actions that may be provided as extensions to the system. For example, the different types of content may be analyzed to determine naming that may extend across such different pieces of content (e.g., the name of a function or parameter), and such names may be changed in a way that differs each time the content is served, e.g., by replacing a named item with randomly-generated characters. Elements within the different types of content may also first be grouped as having a common effect on the operation of the code (e.g., if one element makes a call to another), and then may be re-encoded together in a common manner so that their interoperation with each other will be consistent even after the re-encoding.

Both the analysis of content for determining which transformations to apply to the content, and the transformation of the content itself, may occur at the same time (after receiving a request for the content) or at different times. For example, the analysis may be triggered, not by a request for the content, but by a separate determination that the content newly exists or has been changed. Such a determination may be via a "push" from the web server system reporting that it has implemented new or updated content. The determination may also be a "pull" from the security servers 502a-502n, such as by the security servers 502a-502n implementing a web crawler (not shown) to recursively search for new and changed content and to report such occurrences to the security servers 502*a*-502*n*, and perhaps return the content itself and perhaps perform some processing on the content (e.g., indexing it or otherwise identifying common terms throughout the content, creating DOMs for it, etc.). The analysis to identify portions of the content that should be subjected to polymorphic modifications each time the content is served may then be performed according to the manner discussed above and below.

A rules engine 522 may store analytical rules for performing such analysis and for re-encoding of the content. The rules engine 522 may be populated with rules developed through operator observation of particular content types, such as by operators of a system studying typical web pages that call JavaScript content and recognizing that a particular method is frequently used in a particular manner. Such observation may result in the rules engine 522 being programmed to identify the method and calls to the method so that they can all be grouped and re-encoded in a consistent and coordinated manner.

The decode, analysis, and re-encode module 524 encodes content being passed to client computers from a web server according to relevant policies and rules. The module 524 also reverse encodes requests from the client computers to the relevant web server or servers. For example, a web page may be served with a particular parameter, and may refer to JavaScript that references that same parameter. The decode, analysis, and re-encode module 524 may replace the name of that parameter, in each of the different types of content, with a randomly generated name, and each time the web page is served (or at least in varying sessions), the generated name may be different. When the name of the parameter is passed back to the web server, it may be re-encoded back to its original name so that this portion of the security process may occur seamlessly for the web server.

A key for the function that encodes and decodes such strings can be maintained by the security server system 502 along with an identifier for the particular client computer so that the system 502 may know which key or function to apply, and may otherwise maintain a state for the client computer and its session. A stateless approach may also be employed, whereby the system 502 encrypts the state and stores it in a cookie that is saved at the relevant client computer. The client computer may then pass that cookie data back when it passes the information that needs to be decoded back to its original status. With the cookie data, the system 502 may use a private key to decrypt the state information and use that state information in real-time to decode the information from the client computer. Such a stateless implementation may create benefits such as less management overhead for the server system 502 (e.g., for tracking state, for storing state, and for performing clean-up of stored state information as sessions time out or otherwise end) and as a result, higher overall throughput.

The decode, analysis, and re-encode module 524 and the security server system 502 may be configured to modify web code differently each time it is served in a manner that is generally imperceptible to a user who interacts with such web code. For example, multiple different client computers may request a common web resource such as a web page or web application that a web server provides in response to the multiple requests in substantially the same manner. Thus, a common web page may be requested from a web server, and the web server may respond by serving the same or substantially identical HTML, CSS, JavaScript, images, and other web code or files to each of the clients in satisfaction of the requests. In some instances, particular portions of requested web resources may be common among multiple requests, while other portions may be client or session specific. The decode, analysis, and re-encode module 524 may be adapted to apply different modifications to each instance of a common web resource, or common portion of a web resource, such that the web code that it is ultimately delivered to the client computers in response to each request for the common web resource includes different modifications.

In certain implementations, the analysis can happen a single time for a plurality of servings of the code in different recoded instances. For example, the analysis may identify a particular function name and all of the locations it occurs throughout the relevant code, and may create a map to each such occurrence in the code. Subsequently, when the web content is called to be served, the map can be consulted and random strings may be inserted in a coordinated matter across the code, though the generation of a new name each time for the function name and the replacement of that name into the code, will require much less computing cost than would full re-analysis of the content. Also, when a page is to be served, it can be analyzed to determine which portions, if any, have changed since the last analysis, and subsequent analysis may be performed only on the portions of the code that have changed.

Even where different modifications are applied in responding to multiple requests for a common web resource, the security server system 502 can apply the modifications in a manner that does not substantially affect a way that the user interacts with the resource, regardless of the different transformations applied. For example, when two different client computers request a common web page, the security server system 502 applies different modifications to the web code corresponding to the web page in response to each request for the web page, but the modifications do not substantially affect a presentation of the web page between the two different client computers. The modifications can therefore be made largely transparent to users interacting with a common web resource so that the modifications do not cause a substantial difference in the way the resource is displayed or the way the user interacts with the resource on different client devices or in different sessions in which the resource is requested.

An instrumentation module 526 is programmed to add instrumentation code to the content that is served from a web server. The instrumentation code is code that is programmed to monitor the operation of other code that is served. For example, the instrumentation code may be programmed to identify when certain methods are called, when those methods have been identified as likely to be called by malicious software. When such actions are observed to occur by the instrumentation code, the instrumentation code may be programmed to send a communication to the security server reporting on the type of action that occurred and other meta data that is helpful in characterizing the activity. Such information can be used to help determine whether the action was malicious or benign.

The instrumentation code may also analyze the DOM on a client computer in predetermined manners that are likely to identify the presence of and operation of malicious software, and to report to the security servers 502 or a related system. For example, the instrumentation code may be programmed to characterize a portion of the DOM when a user takes a particular action, such as clicking on a particular on-page button, so as to identify a change in the DOM before and after the click (where the click is expected to cause a particular change to the DOM if there is benign code operating with respect to the click, as opposed to malicious code operating with respect to the click). Data that characterizes the DOM may also be hashed, either at the client computer or the server system 502, to produce a representation of the DOM (e.g., in the differences between part of the DOM before and after a defined action occurs) that is easy to compare against corresponding representations of DOMs from other client computers. Other techniques may also be used by the instrumentation code to generate a compact representation of the DOM or other structure expected to be affected by malicious code in an identifiable manner.

As noted, the content from web servers 504a-504n, as encoded by decode, analysis, and re-encode module 524, may be rendered on web browsers of various client computers. Uninfected client computers 513A-512n represent computers that do not have malicious code programmed to interfere with a particular site a user visits or to otherwise perform malicious activity. Infected client computers 514a-514n represent computers that do have malware or malicious code (518a-518n, respectively) programmed to interfere with a particular site a user visits or to otherwise perform malicious activity. In certain implementations, the client computers 513A-512n, 514a-514n may also store the encrypted cookies discussed above and pass such cookies back through the network 510. The client computers 512A-512n, 514a-514n will, once they obtain the served content, implement DOMs for managing the displayed web pages, and instrumentation code may monitor the respective DOMs as discussed above. Reports of illogical activity (e.g., software on the client device calling a method that does not exist in the downloaded and rendered content) can then be reported back to the server system.

The reports from the instrumentation code may be analyzed and processed in various manners in order to determine how to respond to particular abnormal events, and to track down malicious code via analysis of multiple different similar interactions across different client computers 512A-512n, 514a-514n. For small-scale analysis, each web site operator may be provided with a single security console 507 that provides analytical tools for a single site or group of sites. For example, the console 507 may include software for showing groups of abnormal activities, or reports that indicate the type of code served by the web site that generates the most abnormal activity. For example, a security officer for a bank may determine that defensive actions are needed if most of the reported abnormal activity for its web site relates to content elements corresponding to money transfer operations-an indication that stale malicious code may be trying to access such elements surreptitiously.

Console 507 may also be multiple different consoles used by different employees of an operator of the system 500, and may be used for pre-analysis of web content before it is served, as part of determining how best to apply polymorphic transformations to the web code. For example, in combined manual and automatic analysis like that described above, an operator at console 507 may form or apply rules 522 that guide the transformation that is to be performed on the content when it is ultimately served. The rules may be written explicitly by the operator or may be provided by automatic analysis and approved by the operator. Alternatively, or in addition, the operator may perform actions in a graphical user interface (e.g., by selecting particular elements from the code by highlighting them with a pointer, and then selecting an operation from a menu of operations) and rules may be written consistent with those actions.

A central security console 508 may connect to a large number of web content providers, and may be run, for example, by an organization that provides the software for operating the security server systems 502A-502n. Such console 508 may access complex analytical and data analysis tools, such as tools that identify clustering of abnormal activities across thousands of client computers and sessions, so that an operator of the console 508 can focus on those clusters in order to diagnose them as malicious or benign, and then take steps to thwart any malicious activity.

In certain other implementations, the console 508 may have access to software for analyzing telemetry data received from a very large number of client computers that execute instrumentation code provided by the system 500. Such data may result from forms being re-written across a large number of web pages and web sites to include content that collects system information such as browser version, installed plug-ins, screen resolution, window size and position, operating system, network information, and the like. In addition, user interaction with served content may be characterized by such code, such as the speed with which a user interacts with a page, the path of a pointer over the page, and the like.

Such collected telemetry data, across many thousands of sessions and client devices, may be used by the console 508 to identify what is "natural" interaction with a particular page that is likely the result of legitimate human actions, and what is "unnatural" interaction that is likely the result of a bot interacting with the content. Statistical and machine learning methods may be used to identify patterns in such telemetry data, and to resolve bot candidates to particular client computers. Such client computers may then be handled in special manners by the system 500, may be blocked from interaction, or may have their operators notified that their computer is potentially running malicious software (e.g., by sending an e-mail to an account holder of a computer so that the malicious software cannot intercept it easily).

Figure 6:
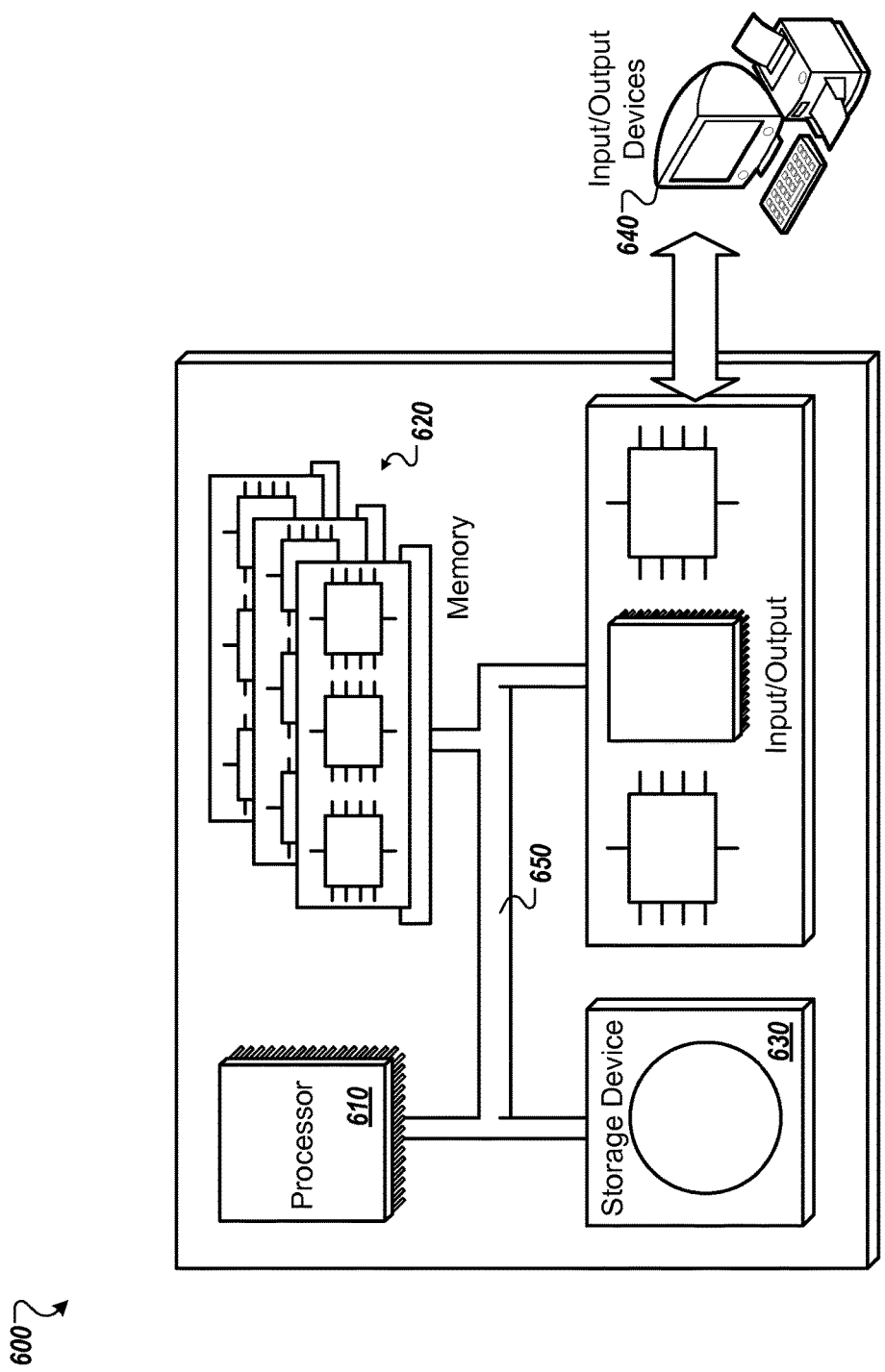
FIG. 6 is a schematic diagram of a general computing system.

FIG. 6 is a schematic diagram of a general computing system 600. The system 600 can be used for the operations described in association with any of the computer-implement methods described previously, according to one implementation. The system 600 is intended to include various forms of digital computers, such as laptops, desktops, workstations, personal digital assistants, servers, blade servers, mainframes, and other appropriate computers. The system 600 can also include mobile devices, such as personal digital assistants, cellular telephones, smartphones, and other similar computing devices. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. The processor may be designed using any of a number of architectures. For example, the processor 610 may be a CISC (Complex Instruction Set Computers) processor, a RISC (Reduced Instruction Set Computer) processor, or a MISC (Minimal Instruction Set Computer) processor.

In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 may be a floppy disk device, a hard disk device, an optical disk device, or a tape device.

The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touch-screen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous. In some implementations, the subject matter may be embodied as methods, systems, devices, and/or as an article or computer program product. The article or computer program product may comprise one or more computer-readable media or computer-readable storage devices, which may be tangible and non-transitory, that include instructions that may be executable by one or more machines such as computer processors.

What is claimed is:

1. A computer-implemented method comprising:
identifying a first set of initial expressions and a second set of initial expressions in computer code requested to be sent from a server system to a client device remote from the server system, wherein the first set of initial expressions and the second set of initial expressions each comprise one or more expressions, are distinct from one another and each comprise potentially sensitive information, and wherein the first set of initial expressions further comprises one or more expressions of instrumentation code for identifying malicious activity;
creating a first plurality of replacement expressions arranged in a first order that, when executed in the first order, provides a first result that is equivalent to a result provided by execution of the first set of initial expressions;
creating a second plurality of replacement expressions arranged in a second order that, when executed in the second order, provides a second result that is equivalent to a result provided by execution of the second set of initial expressions, wherein the first plurality of replacement expressions are distinct from the second plurality of replacement expressions;
generating modified computer code that interferes with an ability of malware to interact with the computer code at the client device by interleaving the first plurality of replacement expressions and the second plurality of replacement expressions with a third set of initial expressions in the computer code to be sent to the client device, wherein the third set of initial expressions excludes the first set of initial expressions and the second set of initial expressions, wherein the interleaving includes:
inserting expressions of the first plurality of replacement expressions between expressions of the third plurality of initial expressions such that a first expression of the first plurality of replacement expressions is positioned between a first pair of expressions of the third set of initial expressions, and a second expression of the first plurality of replacement expressions is positioned between a second pair of expressions of the third set initial expressions, wherein the first pair is different from the second pair; and
inserting expressions of the second plurality of replacement expressions between expressions of the third plurality of initial expressions, wherein the first plurality of replacement expressions appear in the modified computer code in the first order and the second plurality of replacement expressions appear in the modified computer code in the second order; and
providing the modified computer code to the client device;
wherein the method is performed by one or more computing devices.

2. The computer-implemented method of claim 1, further comprising:
identifying two or more expressions of the first set of replacement expressions that can be executed in any order relative to each other without affecting the first result;
determining a modified order of the first set of replacement expressions based on performing a permutation of the two or more expressions in the first set of replacement expressions;
generating second modified computer code by interleaving the first plurality of replacement expressions and the second plurality of replacement expressions with the third set of initial expressions, wherein, as a result of the interleaving, the first plurality of replacement expressions appear in the second modified computer code in the modified order; and
providing the second modified computer code to a second client device requesting the computer code.

3. The computer-implemented method of claim 1, further comprising
identifying a particular replacement expression in the first plurality of replacement expressions;
creating a third plurality of replacement expressions that, when executed, provides a result that is equivalent to the particular replacement expression; and
replacing the particular replacement expression in the first plurality of replacement expressions with the third plurality of replacement expressions.

4. The computer-implemented method of claim 1, wherein the first set of initial expressions comprise formats of code in HTML, CSS, and JavaScript, and wherein each of the formats interoperates with the other formats.

5. The computer-implemented method of claim 1, wherein the first plurality of replacement expressions includes one or more junk expressions that do not execute when the modified computer code is executed on the client device.

6. The computer-implemented method of claim 1, further comprising:
generating second modified computer code that is different from the modified computer code by interleaving the first plurality of replacement expressions, the second plurality of replacement expressions and the third set of initial expressions in a different order;
providing the second modified computer code to a second client device requesting the computer code;
wherein the first plurality of replacement expressions still appear in the second modified computer code in the first order;
wherein the second plurality of replacement expressions still appear in the second modified computer code in the second order.

7. The computer-implemented method of claim 1, wherein the first pair of expressions of the third set of initial expressions shares one expression with the second pair of expressions of the third set of initial expressions.

8. A computer system comprising:
one or more hardware processors;
a memory coupled to the one or more hardware processors and storing one or more instructions, which when executed by the one or more hardware processors cause the one or more hardware processors to:
identify a first set of initial expressions and a second set of initial expressions in computer code requested to be sent from a server system to a client device remote from the server system, wherein the first set of initial expressions comprises and the second set of initial expressions each comprise one or more expressions, are distinct from one another and each comprise potentially sensitive information, and wherein the first set of initial expressions further comprises one or more expressions of instrumentation code for identifying malicious activity;

create a first plurality of replacement expressions arranged in a first order that, when executed in the first order, provides a first result that is equivalent to a result provided by execution of the first set of initial expressions;

create a second plurality of replacement expressions arranged in a second order that, when executed in the second order, provides a second result that is equivalent to a result provided by execution of the second set of initial expressions, wherein the first plurality of replacement expressions are distinct from the second plurality of replacement expressions;

generate modified computer code that interferes with an ability of malware to interact with the computer code at the client device by interleaving the first plurality of replacement expressions and the second plurality of replacement expressions with a third set of initial expressions in the computer code to be sent to the client device, wherein the third set of initial expressions exclude the first set of initial expressions and the second set of initial expressions, wherein the interleaving includes:

inserting expressions of the first plurality of replacement expressions between expressions of the third plurality of initial expressions such that a first expression of the first plurality of replacement expressions is positioned between a first pair of expressions of the third set of initial expressions, and a second expression of the first plurality of replacement expressions is positioned between a second pair of expressions of the third set initial expressions, wherein the first pair is different from the second pair; and inserting expressions of the second plurality of replacement expressions between expressions of the third plurality of initial expressions, wherein the first plurality of replacement expressions appear in the modified computer code in the first order and the second plurality of replacement expressions appear in the modified computer code in the second order; and provide the modified computer code to the client device.

9. The computer system of claim 8, wherein the one or more instructions, when executed by the one or more hardware processors, further cause the one or more hardware processors to:

identify two or more expressions of the first set of replacement expressions that can be executed in any order relative to each other without affecting the first result;

determine a modified order of the first set of replacement expressions based on performing a permutation of the two or more expressions in the first set of replacement expressions;

generate second modified computer code by interleaving the first plurality of replacement expressions and the second plurality of replacement expressions with the third set of initial expressions of the computer code, wherein, as a result of the interleaving, the first plurality of replacement expressions appear in the second modified computer code in the modified order; and provide the second modified computer code to a second client device requesting the computer code.

10. The computer system of claim 8, wherein the one or more instructions, when executed by the one or more hardware processors, further cause the one or more hardware processors to:

identify a particular replacement expression in the first plurality of replacement expressions;

create a third plurality of replacement expressions that, when executed, provides a result that is equivalent to the particular replacement expression; and replace the particular replacement expression in the first plurality of replacement expressions with the third plurality of replacement expressions.

11. The computer system of claim 8, wherein the first set of initial expressions comprise formats of code in HTML, CSS, and JavaScript, and wherein each of the formats interoperates with the other formats.

12. The computer system of claim 8, wherein the first plurality of replacement expressions includes one or more junk expressions that do not execute when the modified computer code is executed on the client device.

13. The computer system of claim 8, wherein the one or more instructions, when executed by the one or more hardware processors, further cause the one or more hardware processors to:

generate second modified computer code that is different from the modified computer code by interleaving the first plurality of replacement expressions, the second plurality of replacement expressions and the third set of initial expressions in a different order; and provide the second modified computer code to a second client device requesting the computer code;

wherein the first plurality of replacement expressions still appears in the second modified computer code in the first order;

wherein the second plurality of replacement expressions still appears in the second modified computer code in the second order.

14. The computer system of claim 8, wherein the first pair of expressions of the third set of initial expressions shares one expression with the second pair of expressions of the third set of initial expressions.

15. A computer-implemented method comprising:

identifying a first set of initial expressions and a second set of initial expressions in computer code requested to be sent from a server system to a client device remote from the server system, wherein the first set of initial expressions and the second set of initial expressions each comprise one or more expressions, are distinct from one another and each comprise potentially sensitive information;

creating a first plurality of replacement expressions arranged in a first order that, when executed in the first order, provides a first result that is equivalent to a result provided by execution of the first set of initial expressions;

creating a second plurality of replacement expressions arranged in a second order that, when executed in the second order, provides a second result that is equivalent to a result provided by execution of the second set of initial expressions, wherein the first plurality of replacement expressions are distinct from the second plurality of replacement expressions;

generating modified computer code that interferes with an ability of malware to interact with the computer code at the client device by interleaving the first plurality of replacement expressions and the second plurality of replacement expressions with a third set of initial expressions in the computer code to be sent to the client device, wherein the third set of initial expressions excludes the first set of initial expressions and the second set of initial expressions, wherein the interleaving includes:

inserting expressions of the first plurality of replacement expressions between expressions of the third plurality of initial expressions such that a first expression of the first plurality of replacement expressions is positioned between a first pair of expressions of the third set of initial expressions, and a second expression of the first plurality of replacement expressions is positioned between a second pair of expressions of the third set initial expressions, wherein the first pair is different from the second pair; and inserting expressions of the second plurality of replacement expressions between expressions of the third plurality of initial expressions, wherein the first plurality of replacement expressions appear in the modified computer code in the first order and the second plurality of replacement expressions appear in the modified computer code in the second order; and providing the modified computer code to the client device;

wherein the first plurality of replacement expressions includes one or more junk expressions that do not execute when the modified computer code is executed on the client device;

wherein the method is performed by one or more computing devices.

16. The computer-implemented method of claim 15, further comprising:

identifying two or more expressions of the first set of replacement expressions that can be executed in any order relative to each other without affecting the first result;

determining a modified order of the first set of replacement expressions based on performing a permutation of the two or more expressions in the first set of replacement expressions;

generating second modified computer code by interleaving the first plurality of replacement expressions and the second plurality of replacement expressions with the third set of initial expressions of the computer code, wherein, as a result of the interleaving, the first plurality of replacement expressions appear in the second modified computer code in the modified order; and providing the second modified computer code to a second client device requesting the computer code.

17. The computer-implemented method of claim 15, further comprising:

generating second modified computer code that is different from the modified computer code by interleaving the first plurality of replacement expressions, the second plurality of replacement expressions and the third set of initial expressions in a different order;

wherein the first plurality of replacement expressions still appear in the second modified computer code in the first order;

wherein the second plurality of replacement expressions still appear in the second modified computer code in the second order.

18. A computer system comprising:

one or more hardware processors;

a memory coupled to the one or more hardware processors and storing one or more instructions, which when executed by the one or more hardware processors cause the one or more hardware processors to:

identify a first set of initial expressions and a second set of initial expressions in computer code requested to be sent from a server system to a client device remote from the server system, wherein the first set of initial expressions and the second set of initial expressions each comprise one or more expressions, are distinct from one another and each comprise potentially sensitive information;

create a first plurality of replacement expressions arranged in a first order that, when executed in the first order, provides a first result that is equivalent to a result provided by execution of the first set of initial expressions;

create a second plurality of replacement expressions arranged in a second order that, when executed in the second order, provides a second result that is equivalent to a result provided by execution of the second set of initial expressions, wherein the first plurality of replacement expressions are distinct from the second plurality of replacement expressions;

generate modified computer code that interferes with an ability of malware to interact with the computer code at the client device by interleaving the first plurality of replacement expressions and the second plurality of replacement expressions with a third set of initial expressions in the computer code to be sent to the client device, wherein the third set of initial expressions excludes the first set of initial expressions and the second set of initial expressions, wherein the interleaving includes:

insert expressions of the first plurality of replacement expressions between expressions of the third plurality of initial expressions such that a first expression of the first plurality of replacement expressions is positioned between a first pair of expressions of the third set of initial expressions, and a second expression of the first plurality of replacement expressions is positioned between a second pair of expressions of the third set initial expressions, wherein the first pair is different from the second pair; and insert expressions of the second plurality of replacement expressions between expressions of the third plurality of initial expressions, wherein the first plurality of replacement expressions appear in the modified computer code in the first order and the second plurality of replacement expressions appear in the modified computer code in the second order; and provide the modified computer code to the client device;

wherein the first plurality of replacement expressions includes one or more junk expressions that do not execute when the modified computer code is executed on the client device;

wherein the method is performed by one or more computing devices.

19. The computer system of claim 18, wherein the one or more instructions, when executed by the one or more hardware processors, further cause the one or more hardware processors to:

identify two or more expressions of the first set of replacement expressions that can be executed in any order relative to each other without affecting the first result;

determine a modified order of the first set of replacement expressions based on performing a permutation of the two or more expressions in the first set of replacement expressions;

generate second modified computer code by interleaving the first plurality of replacement expressions and the second plurality of replacement expressions with the third set of initial expressions of the computer code, wherein, as a result of the interleaving, the first plurality of replacement expressions appear in the second modified computer code in the modified order; and provide the second modified computer code to a second client device requesting the computer code.

20. The computer system of claim 18, wherein the one or more instructions, when executed by the one or more hardware processors, further cause the one or more hardware processors to:

generate second modified computer code that is different from the modified computer code by interleaving the first plurality of replacement expressions, the second plurality of replacement expressions and the third set of initial expressions in a different order;

wherein the first plurality of replacement expressions still appear in the second modified computer code in the first order;

wherein the second plurality of replacement expressions still appear in the second modified computer code in the second order.

* * * * *